United States Patent [19]
Sasaki

[11] Patent Number: 5,107,910
[45] Date of Patent: Apr. 28, 1992

[54] WOOD WORKING MACHINE
[75] Inventor: Takashi Sasaki, Shizuoka, Japan
[73] Assignee: Murakami Iron Works Co., Ltd., Shizuoka, Japan
[21] Appl. No.: 679,494
[22] Filed: Apr. 2, 1991
[30] Foreign Application Priority Data
 Feb. 13, 1991 [JP] Japan .................. 3-40449
[51] Int. Cl.$^5$ .................. B23B 7/04; B27C 9/04
[52] U.S. Cl. .................. 144/1 A; 29/26 A; 29/39; 29/40; 144/1 R; 144/252 R; 409/134; 409/137
[58] Field of Search ............... 29/26 R, 26 A, 39, 40, 29/45, 561, 563, 564; 409/134, 137; 144/1 R, 1 A, 252 R

[56] References Cited
U.S. PATENT DOCUMENTS

| | | | |
|---|---|---|---|
| 4,200,417 | 4/1980 | Hager et al. | 144/252 R |
| 4,313,478 | 2/1982 | Suzuki | 144/1 A |
| 4,593,731 | 6/1986 | Tanaka | 144/1 A |
| 4,945,958 | 8/1990 | Shoda | 144/1 A |
| 4,957,148 | 9/1990 | Shoda | 144/252 R |

FOREIGN PATENT DOCUMENTS

| | | |
|---|---|---|
| 60-13605 | 5/1985 | Japan . |
| 1-33290 | 10/1989 | Japan . |
| 2-59244 | 2/1990 | Japan . |

Primary Examiner—W. Donald Bray
Attorney, Agent, or Firm—Sughrue, Mion, Zinn, Macpeak & Seas

[57] ABSTRACT

A wood working machine comprises a carriage on which a plurality of working heads are mounted in a juxtaposed relationship, and a tool magazine and an exchanging unit provided on the carriage for each of the working heads such that exchanging of a tool can be performed on the working heads independently of each other on the carriage. A dust collecting passageway is formed between a motor for a spindle of each of the working heads and a motor hood for the motor, and an additional auxiliary dust collecting passageway is formed on each of rams on which the working heads are individually held. A wide dust collecting range is thus assured.

5 Claims, 8 Drawing Sheets

WOOD WORKING MACHINE

BACKGROUND OF THE INVENTION

1. Field of the Invention

This invention relates to a wood working machine such as a wood working router.

2. Description of the Prior Art

A numerically controlled wood working router is conventionally known wherein a plurality of rams are mounted for up and down movement on a carriage mounted for horizontal sliding movement and a working head is carried on each of the rams. Also an automatic tool exchanging apparatus for a numerically controlled wood working router of the type mentioned is conventionally known and disclosed, for example, in Japanese Patent Laid-Open Application No. 2-59244. However, only one such automatic tool exchanging apparatus is provided for a numerically controlled wood working router while the latter includes a plurality of rams. Besides, such automatic tool exchanging apparatus is installed fixedly at a particular location, and accordingly, when a tool is to be exchanged, a particular working head on which the tool is to be changed is moved together with all of the other working heads to the location of the automatic tool exchanging apparatus, and then only the tool of the particular working head is exchanged.

With the arrangement, however, even when a tool is to be exchanged for one working head, working operations of all of the working heads must be stopped, and consequently, the operability is very low.

On the other hand, a conventional wood working router normally includes a dust collecting equipment for collecting wood chips produced by working by a sucking action of air to remove them. An exemplary one of such conventional dust collecting equipments is disclosed, for example, in Japanese Utility Model Publication No. 1-33290 wherein a motor for a spindle is accommodated in a dust collecting hood and a dust collecting passageway is formed between the motor and the hood. Another exemplary conventional dust collecting equipment is disclosed in Japanese Utility Model Publication No. 60-13605 wherein a housing for a motor serves also as a dust collecting hood. Such conventional dust collecting equipments, however, cannot assure a sufficiently wide dust collecting range. Then if the size of such dust collecting hood or motor housing is increased in order to increase the dust collecting range, also the size of the equipment is increased as much.

SUMMARY OF THE INVENTION

It is an object of the present invention to provided a wood working machine wherein, when a tool exchanging operation is proceeding for one of a plurality of working heads, any other working head can continue its working operation and besides tool exchanging operations as well as same working operations can be performed simultaneously with the working heads.

It is another object of the present invention to provide a wood working machine which has a wide dust collecting range without being increased in size and is high in dust collecting efficiency.

In order to attain the objects, according to the present invention, a wood working machine comprises a plurality of tool magazines mounted on a carriage in a on-by-one corresponding relationship to a plurality of working heads, and a plurality of exchanging units mounted on the carriage in a one-by-one corresponding relationship to the working heads between the working heads and tool magazines. Each of the tool magazines includes an index plate for removably holding a plurality of tools thereon, and rotating means for rotating the index plate to feed the tools on the index plate one by one to an exchanging position. Each of the exchanging units includes an arm with a grip for transferring a tool between the index plate and a spindle of the working head when the spindle is moved up to the exchanging position, and turning means and upwardly and downwardly moving means for turning and upwardly and downwardly moving the arm, respectively.

With the wood working machine, since the tool magazine and exchanging unit are provided for each of the working heads on the carriage on which the working heads are mounted in a juxtaposed relationship, automatic exchanging of a tool can be performed separately for the individual working heads and simultaneously on the same carriage. Accordingly, when a tool exchanging operation is proceeding on one of the working heads, another one of the working heads can continue its working operation without an interruption. Further, a tool exchanging operation or a working operation can be performed simultaneously on the different working heads.

An air nozzle for jetting air therefrom may be disposed adjacent the exchanging position of each of the tool magazines so that a tool can be cleaned in a exchanging operation and possible sticking of wood chips and so forth to a tool holding portion can be prevented.

Preferably, a motor for the spindle of each of the working heads is disposed in a motor hood and a dust collecting passageway for collecting wood chips and so forth from a lower opening thereof is formed between the motor and the motor hood, and an auxiliary dust collecting passageway is formed on each of the rams such that it joins at an upper end thereof to the dust collecting passageway. Due to such auxiliary dust collecting passageway, a dust collecting area is increased as much.

Preferably, a dust collecting hood is provided at a lower end of the motor hood in such a manner as to include the lower openings of the dust collecting passageway and auxiliary dust collecting passageway.

Perferably, a generally annular brush is provided vertically downwardly for upward and downward movement on the dust collecting hood of each of the working heads, and upwardly and downwardly moving means for moving the brush upwardly and downwardly is mounted on each of the working heads. When a tool is to be transferred between the spindle and the index plate by means of the arm with a grip, the brush of the dust collecting hood can be moved upwardly to a retracted position at which it does not interfere with turning motion of the arm.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
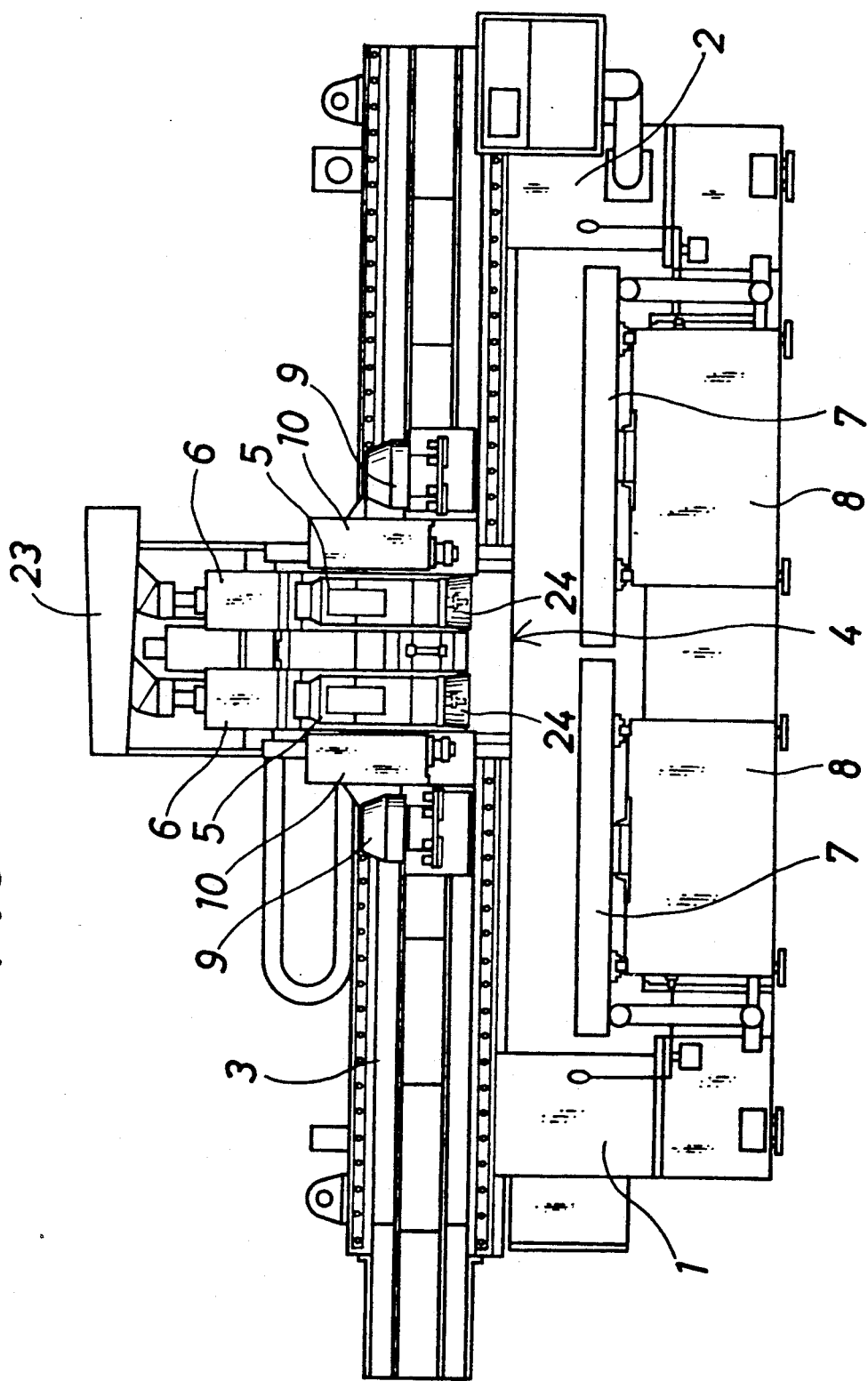
FIG. 1 is a front elevational view of an entire wood working router to which the recent invention is applied.

Referring first to FIG. 1, there is shown an entire numerically controlled wood working router to which the present invention is applied. The wood working router shown includes a beam 3 mounted on and extending horizontally between a pair of left and right columns 1 and 2. A carriage 4 is mounted for leftward and rightward sliding movement on the beam 3 in a known manner, aand a pair of working heads 5 are mounted for upward and downward movement at left and right locations on a front face of the carriage 4. Each of the working heads 5 is moved upwardly or downwardly in a well known manner by a head lifting motor 6. A pair of left and right slide tables 7 for individual receiving a work thereon are mounted for individual forward and backward sliding movement on a pair of left and right beds 8, respectively, which are located between the left and right columns 1 and 2. It is to be noted that the carriage 4 may be constituted from two separate carriage members which are provided individually for the working heads 5 mounted separately from each other and are connected to each other for integral sliding movement or alternatively from a single member which is common for the two working heads 5.

Figure 2:
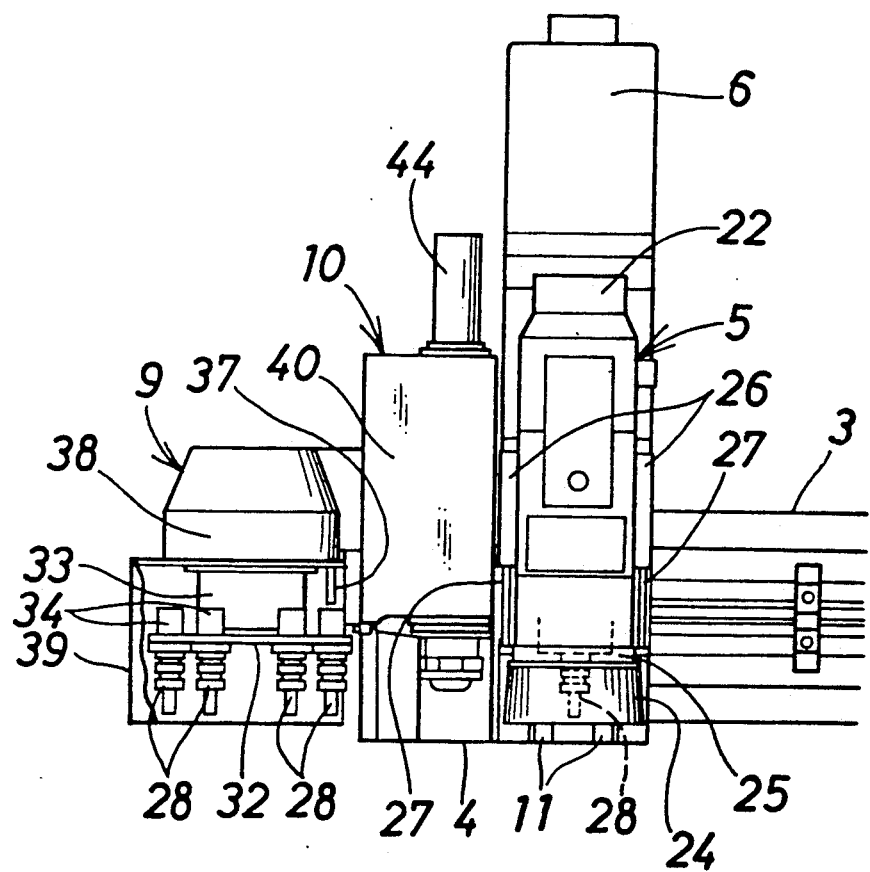
FIG. 2 is a front elevational view of an automatic tool exchanging apparatus for the wood working router of FIG. 1.

A pair of left and right tool magazines 9 and a pair of left and right exchanging units 10 are mounted on the front face of the carriage 4 in a one-by-one corresponding relationship to the left and right working heads 5. The left and right tool magazines 9 are located at left and right end portions of the carriage 4 while the left and right exchanging units 10 are located between the left and right working heads 5 and tool magazines 9, respectively. A left-hand side set of such working head 5, tool magazine 9 and exchanging unit 10 is shown in front elevation in FIG. 2 and in side elevation in FIG. 3, and further, a bottom plan thereof is shown in an enlarged scale in FIG. 4 while a front elevation thereof is showm, partly broken, in an enlarged scale in FIG. 5.

Figure 6:
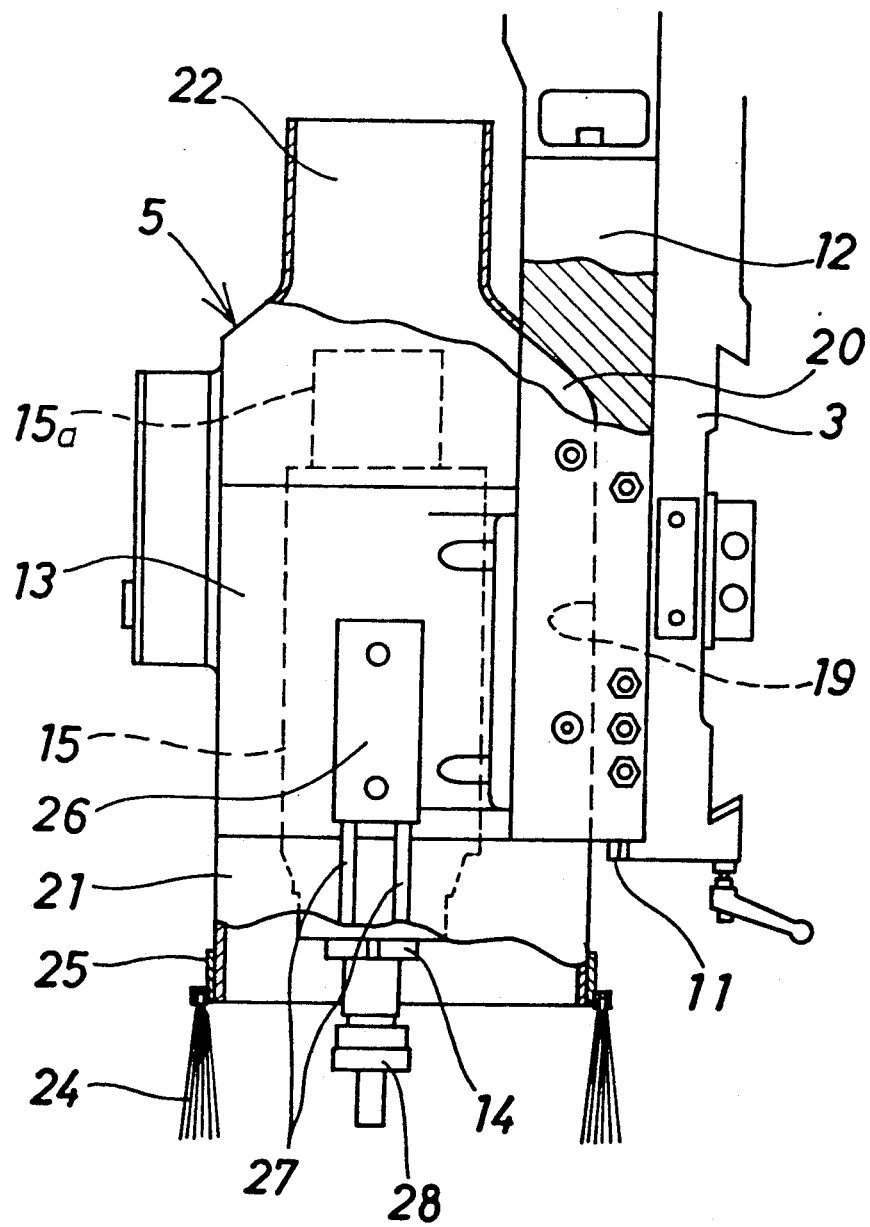
FIG. 6 is a side elevational view, partly broken, of a working head of the wood working router of FIG. 1.
Figure 7:
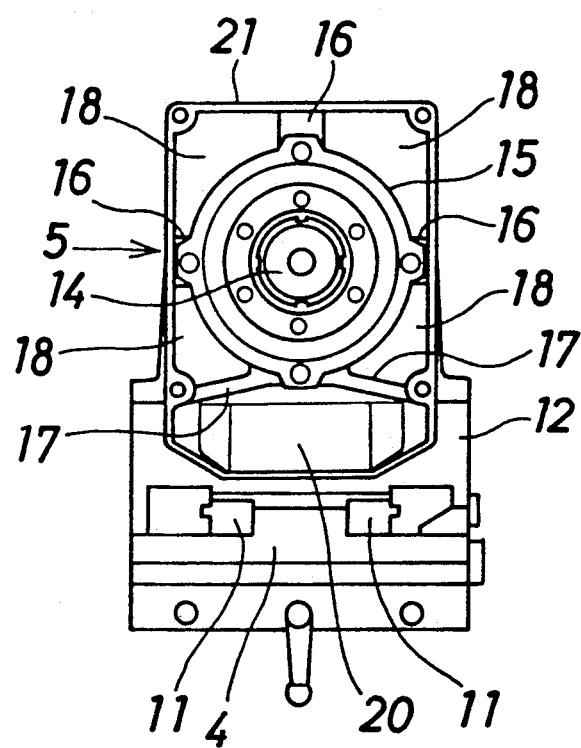
FIG. 7 is a bottom plan view of the working head of FIG. 6 with a brush omitted.
Figure 8:
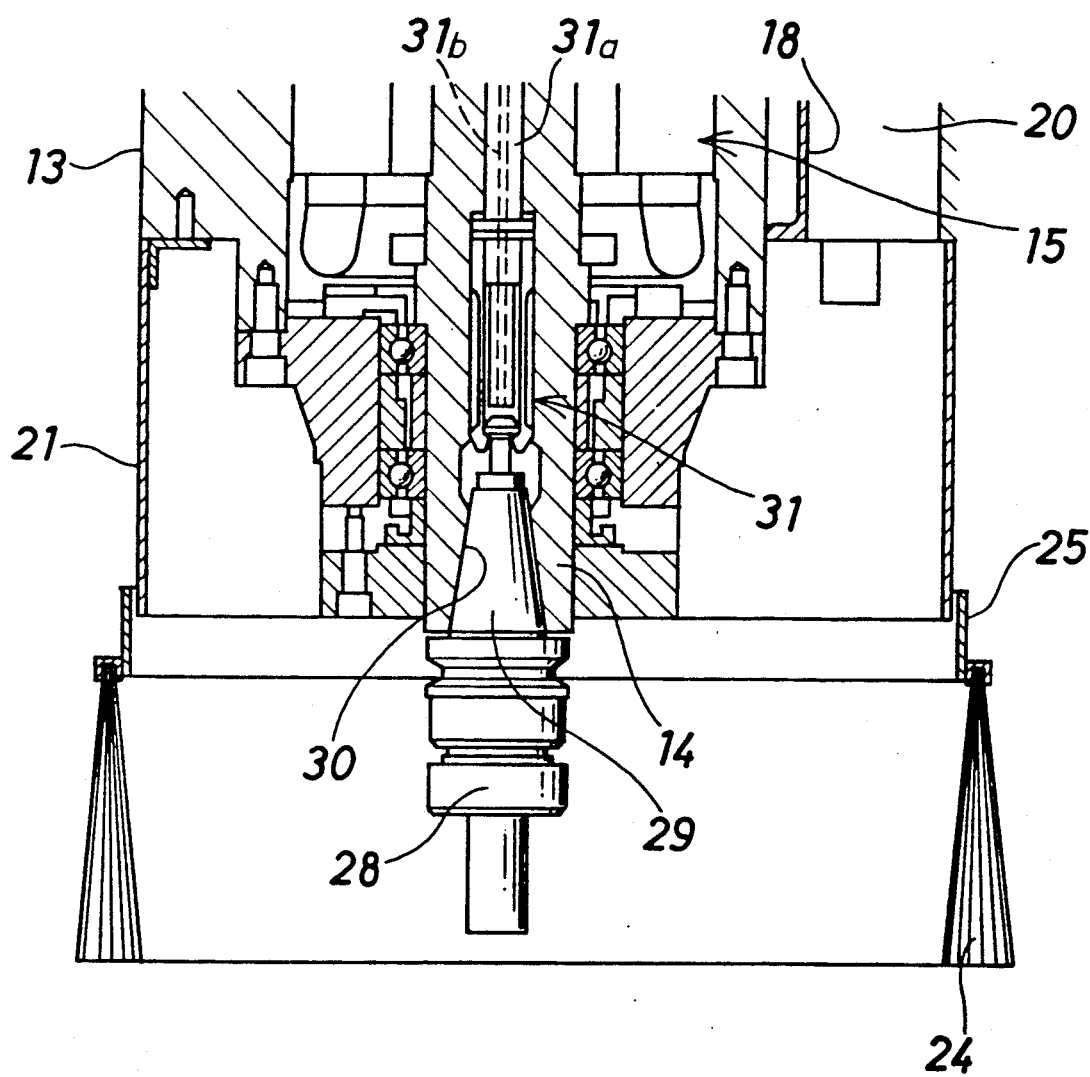
FIG. 8 is an enlarged sectional view of part of the working head of FIG. 6.

Referring now to FIGS. 6, 7 and 8, each of the working heads 5 includes a ram 12 mounted for vertically upward and downward sliding movement along a vertical rail 11 on the front face of the carrier 4. A motor hood 13 is securely mounted on the ram 12 for the working head 5, and a spindle motor 15 for rotating a spindle 14 is secured in the motor hood 13 by way of a plurality of ribs 16 and 17 while a plurality of dust collecting passageways 18 are defined by the ribs 16 and 17 between the motor hood 13 and the motor 15. A vertically elongated recess 19 is formed on a front face of the ram 12 and is separated by the ribs 17 from the dust collecting passageways 18 in the motor hood 13 to form an auxiliary dust collecting passagway 20. A tool mounting cylinder apparatus 15a for mounting and removing a tool onto and from the spindle 14 is provided at a top end of the motor 15 and is accommodated in the motor hood 13. It is to be noted that the motor hood 13 may otherwise serve also as a housing for the motor 15.

A rectangular dust collecting hood 21 is securely mounted at a bottom end of the motor hood 13. The dust collecting hood 21 has a size sufficient to include an entire range of a lower opening of the motor hood 13 and a lower opening of the auxiliary dust collecting passageway 20. The dust collecting passageways 18 and auxiliary dust collecting passageway 20 join to a connecting port 22 at an upper end of the motor hood 13. The connecting ports 22 of the two working heads 5 are connected to a common duct 23 shown in FIG. 1 so that air may be sucked at a time from the dust collecting passageways 18 and auxiliary dust collecting passageways 20 of the two working heads 5.

A rectangular annular brush holder 25 is provided on an outer periphery of the lower end portion of the dust collecting hood 21 and has a brush 24 provided vertically downwardly on an entire periphery thereof. The brush holder 25 is supported at lower ends of piston rods of a pair of cylinder apparatus 26 securely mounted on the opposite outer faces of the motor hood 13. When the piston rods 27 of the cylinder apparatus 26 are in their normal extended or advanced position, the brush 24 is set at a lower position at which it surrounds a tool 28 held on the spindle 14 as seen in FIGS. 6 and 8, but when the piston rods 27 are retracted or contracted, the brush 24 is moved upwardly to its upper retracted position at which the tool 28 is exposed as seen in FIG. 5.

When a working operation is to be performed with the tool 28, the brush 24 is moved down to its lower position so that dust may be collected by the way of the dust collecting hood 21 while sweeping out wood chips. Since each of the working heads 5 has, in addition to the dust collecting passageways 18 between the motor 15 and the motor hood 13, the auxiliary dust collecting passageway 20 in the ram 12 and besides the dust collecting hood 21 and the brush 24 have a size sufficient to include a total sectional range of the dust collecting passageways 18 and auxiliary dust collecting passageway 20, the dust collecting range is increased by a sectional area of the auxiliary dust collecting passageway 20, resulting in improvement in dust collecting efficiently.

Referring to FIG. 8, the spindle 14 has such a structure that a head 29 of a tool 28 is fitted from below into a tool receiving hole 30 formed in the spindle 14 and is removably clamped by a collet chuck 31. An operating shaft 31a of the collet chuck 31 extends through the spindle 14 and is connected to a piston of the corresponding tool mounting cylinder apparatus 15a. The operating shaft 31a has an air passageway 31b formed axially therethrough.

Figure 3:
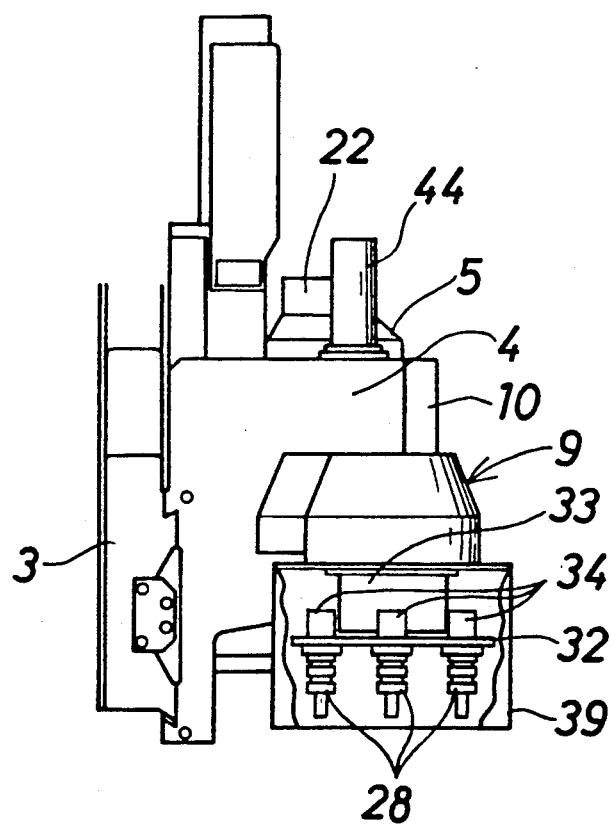
FIG. 3 is a side elevational view of the automatic tool exchanging apparatus of FIG. 2.
Figure 4:
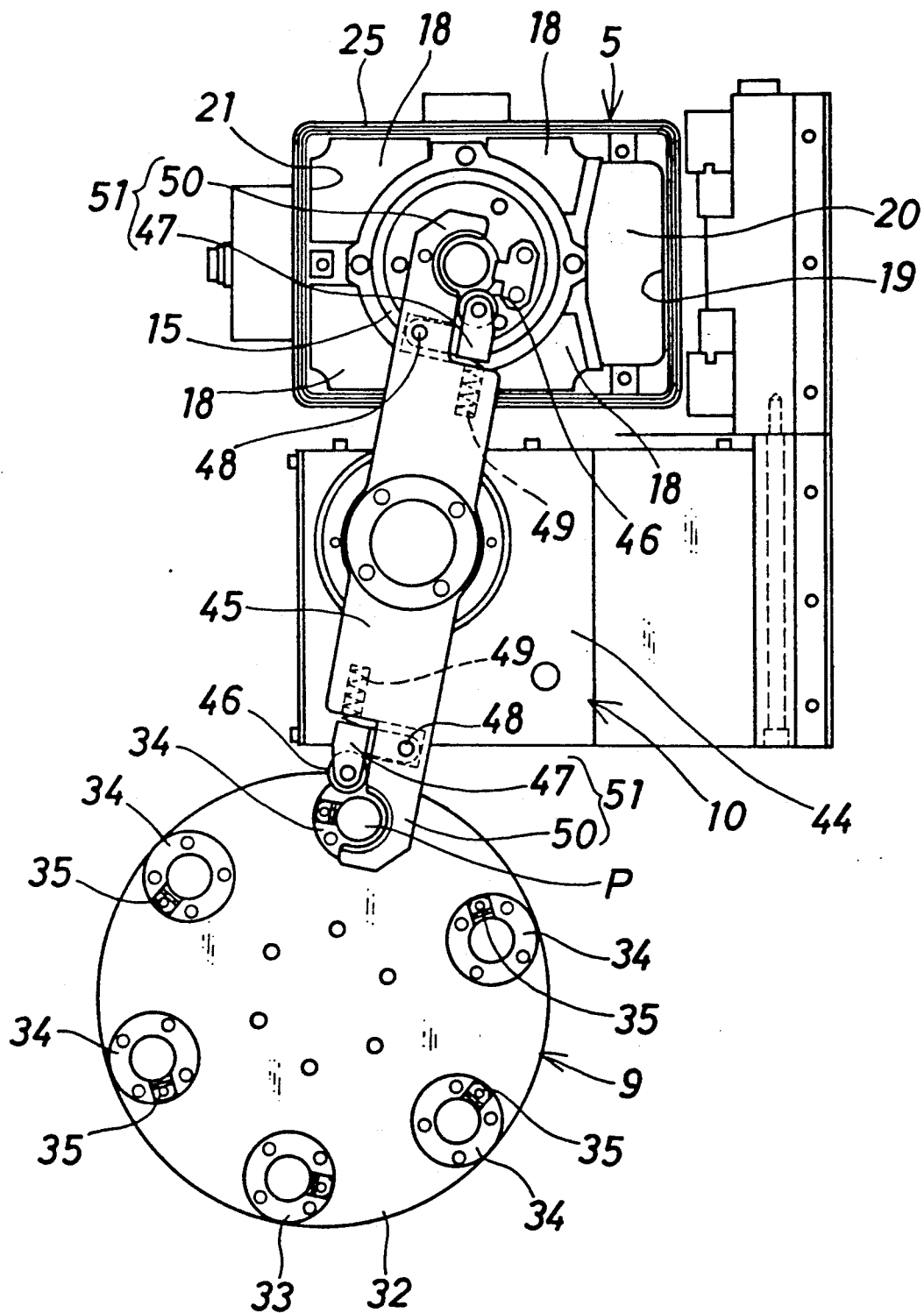
FIG. 4 is an enlarged bottom plan view of the automatic tool exchanging apparatus of FIG. 2.
Figure 5:
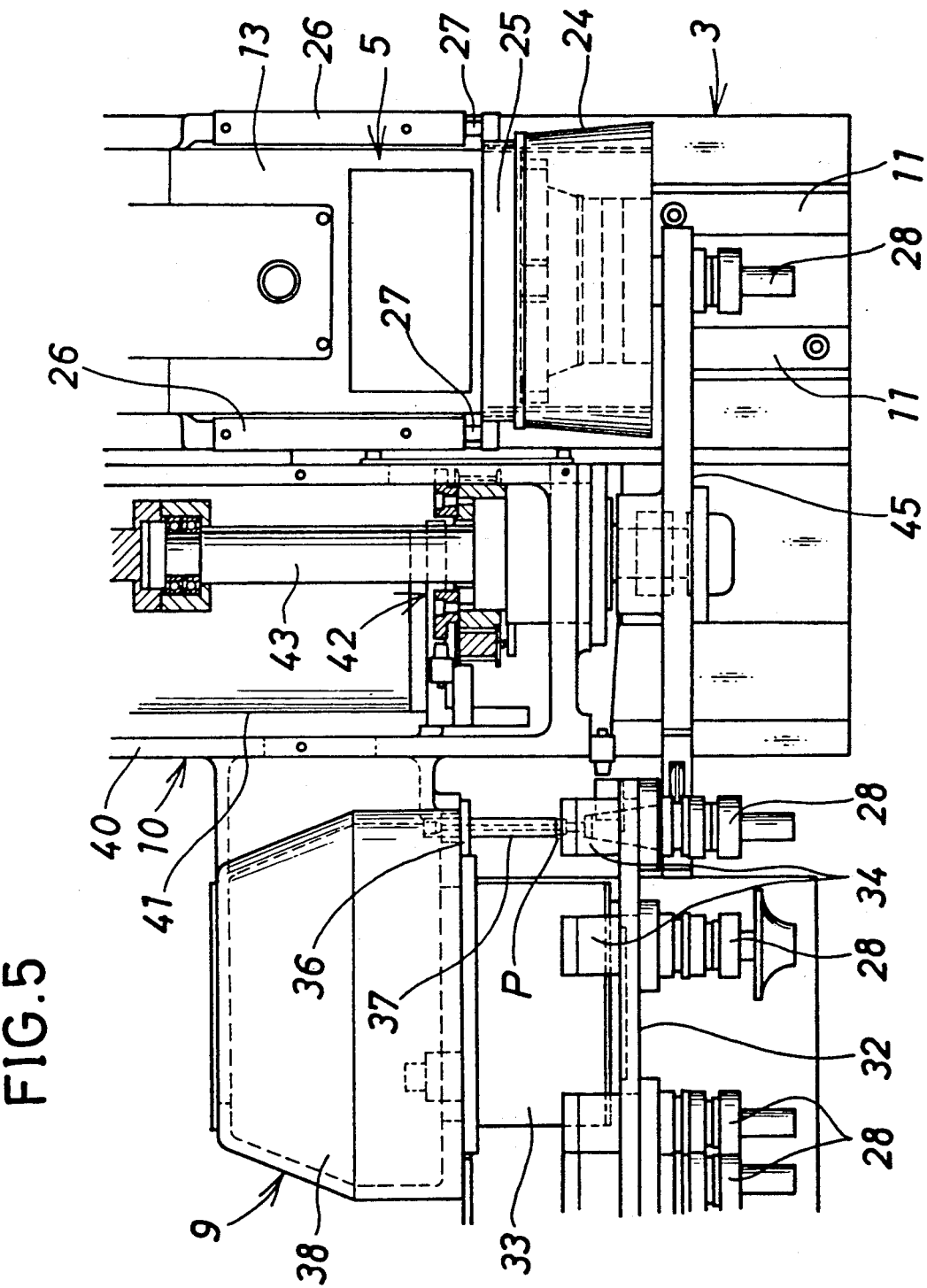
FIG. 5 is an enlarged front elevational view, partly broken, on the automatic tool exchanging apparatus of FIG. 2.

Referring now to FIGS. 3 to 5, each of the tool magazines 9 is constituted such that a horizontal circular index plate 32 is rotated in a known structure by an indexing motor 33. A plurality of tool pots 34 for removably a tool 28 therein are provided in a predetermined circumferentially spaced relationship on the index plate 32. The tool pots 34 are indexed one by one to an exchanging position P shown in FIG. 4 by rotation of the index plate 32. Each of the tool pots 34 has a key 35 for positioning a tool 28 thereon.

Referring to FIG. 5, the indexing motor 33 is mounted on a base plate 36, and an air nozzle 37 in the form of a pipe is mounted on the base plate 36 above the exchanging position P. Thus, upon a tool exchanging operation, air is jetted from the air nozzle 37 into a tool pot 34 at the exchanging position P. A hood 38 is mounted on the base plate 36 above the indexing motor 33, and the motor 33 and the index plate 32 are accommodated in a transparent protective cover 39 which is opened at a portion thereof around the exchanging position P as seen in FIG. 3.

Referring to FIGS. 4 and 5, each of the exchanging units 10 includes a servomotor 41 accommodated in a housing 40. Rotation of the servomotor 41 is transmitted to a turning shaft 43 in the housing 40 by way of a belt-and-pulley rotation transmitting mechanism 42. The turning shaft 43 is moved upwardly or downwardly by a cylinder apparatus 44 (FIG. 2) mounted at the top end of the housing 40. An arm 45 is securely mounted at a mid portion thereof to a lower end of the turning shaft 43 so that it is turned horizontally by the servomotor 41. It is to be noted that the mechanism for turning the arm 45 may otherwise employ a cylinder apparatus. A pair of fingers 47 are mounted for pivotal motion at the opposite ends of the arm 45 each by means of a pin 48, and a roller 46 is supported for rotation on each of the fingers 47. Each of the fingers 47 is normally urged by a spring 49 and cooperates with a hooked portion 50 at a corresponding end of the arm 45 itself to constitute a grip 51 for gripping a neck portion of a tool 28.

A transferring operation of a tool 28 between a spindle 14 and an index plate 32 proceeds in the following procedure for each of the woking heads 5.

(1) The working head 5 is moved upwardly by the head lifting motor 6 and the spindle 14 is stopped at a predetermined height.

(2) The spindle 14 on the working head 5 is locked by a locking mechanism not shown in the motor 15.

(3) The index plate 32 of the tool magazine 9 is rotated by the indexing motor 33 so that a tool 28 to be exchangeably mounted subsequently is indexed to the exchanging position P.

(4) The arm 45 of the exchanging unit 10 is turned from its standby position by the servomotor 41, and a tool 28 currently held on the spindle 14 is gripped by one of the grips 51 at the opposite ends of the arm 45 while the other grip 51 grips the tool 28 indexed at the exchanging position P.

(5) The arm 45 of the exchanging unit 10 is moved down by the cylinder apparatus 44, and at the same time, the operating shaft 31a of the collet chuck 31 of the working head 5 is moved down by the cylinder apparatus 15a so that the tool 28 is released from the collet chuck 31 and is pushed out from the tool receiving hole 30 by the operating shaft 31a. Consequently, the tool 28 which has been held on the spindle 14 is released from the spindle 14 and is now held by the one grip 51 of the arm 45. Simultaneously, the tool 28 which has been held in the pot 34 at the exchanging position P is pulled out from the tool pot 34 and is now held on the other grip 51. Thereupon, on the working head 5, air is jetted from the air passageway 31b of the operating shaft 31a. It is to be noted that, in this instance, air may further be jetted from the air nozzle 37 in the tool magazine 9.

(6) The arm 45 is turned to its neutral position.

(7) The index plate 32 of the tool magazine 10 is rotated so that an empty tool pot 34 corresponding to the tool 28 which has been held on the spindle 14 so far is indexed.

(8) The arm 45 is turned from its neutral position so that the tool 28 to be exchangeably mounted subsequently is positioned just below the spindle 14 while the tool 28 which has been held on the spindle 14 is positioned just below the empty tool pot 34 at the exchanging position P. Thereupon, air is jetted from the air nozzle 37 into the empty tool pot 34 at the exchanging position P so that the tool 28 and the tool pot 34 are cleaned. Air is jetted also from the air passageway 31b of the operating shaft 31a to the spindle 14, and consequently, the tool 28 and the tool receiving hole 30 are cleaned while wood chaips are prevented from entering the tool reciving hole 30 for a period of time after starting to completion of the exchanging operation.

(9) The arm 45 is moved upwardly, and the tool 28 from the spindle 14 is held on the tool pot 34 at the exchanging position P while at the same time the tool 28 from the tool pot 34 is inserted into the tool receiving hole 30 of the spindle 14. After then, the operating shaft 31a is moved upwardly and the tool 28 is clamped by the collet chuck 31.

(10) The arm 45 is turned to its standby position.

Such a tool exchanging operation as described above can be performed for the two working heads 5 not only independently of each other but also in parallel to each other. Accordingly, not only a working operation can be continued without being stopped on one of the working heads 5 while a tool exchanging operation is performed on the other working head 5, but also a tool changing operation or a working operation can be performed simultaneously on the two working heads 5. It is to be noted that the wood working machine may otherwise include three or more sets of such working head 5, tool magazine 9 and exchanging unit 10.

Having now fully described the invention, it will be apparent to one of ordinary skill in the art that many changes and modifications can be made thereto without departing from the spirit and scope of the invention as set forth herein.

What is claimed is:

1. A wood working machine wherein a plurality of rams are mounted for up and down movement in a juxtaposed relationship on a carriage mounted for horizontal sliding movement on a beam and a working head is carried on each of said rams, comprising a plurality of tool magazines mounted on said carriage equal in number to said working heads, and a plurality of exchanging units mounted on said carriage equal in number to said working heads and located between said working heads and said tool magazines, each of said tool magazines including an index plate for removably holding a plurality of tools thereon and rotating means for rotating said index plate to feed the tools on said index plate one by to an exchanging position, each of said exchanging units including an arm with a grip for transferring a tool between said index plate and a spindle of the working head when said spindle is moved up to the exchanging position and turning means and upwardly and downwardly moving means for turning and upwardly and downwardly moving said arm, respectively.

2. A wood working machine as claimed in claim 1, further comprising an air nozzle disposed adjacent the exchanging position of each of said tool magazines for jetting air therefrom.

3. A wood working machine as claimed in claim 1, wherein a motor for said spindle of each of said working heads is disposed in a motor hood and a dust collecting passageway for collecting wood chips from a lower opening thereof is formed between said motor and said motor hood, and an auxiliary dust collecting passageway is formed on each of said rams such that it joins at an upper end thereof to said dust collecting passageway.

4. A wood working machine as claimed in claim 3, wherein a dust collecting hood is provided at lower end of said motor hood in such a manner as to include the lower openings of said dust collecting passageway and auxiliary dust collecting passageway.

5. A wood working machine as claimed in claim 4, further comprising a generally annular brush provided vertically downwardly for upward and downward movement on said dust collecting hood of each of said working heads, and upwardly and downwardly moving mejans mounted on each of said working heads for moving said brush upwardly and downwardly.

* * * * *